(12) United States Patent  (10) Patent No.: US 8,120,919 B2
Lyon                       (45) Date of Patent:      Feb. 21, 2012

(54) ADJUSTABLE MOUNTING BRACKET FOR A COMPUTER COMPONENT

(75) Inventor: Geoff Sean Lyon, Calgary (CA)

(73) Assignee: Coolit Systems Inc., Calgary (CA)

( * ) Notice: Subject to any disclaimer, the term of this patent is extended or adjusted under 35 U.S.C. 154(b) by 0 days.

(21) Appl. No.: 12/646,490

(22) Filed: Dec. 23, 2009

(65) Prior Publication Data

US 2011/0149506 A1 Jun. 23, 2011

(51) Int. Cl.
*H05K 7/20* (2006.01)
*G06F 1/20* (2006.01)

(52) U.S. Cl. ............ 361/719; 361/679.48; 361/679.54; 361/695; 361/697; 361/704; 165/80.2; 165/80.3; 165/185

(58) Field of Classification Search ............ 361/679.54, 361/697, 702, 704, 709–710, 719; 165/80.2–80.3, 165/185; 174/16.3
See application file for complete search history.

(56) References Cited

U.S. PATENT DOCUMENTS

| | | |
|---|---|---|
| 6,055,159 A | 4/2000 | Sun |
| 6,082,440 A | 7/2000 | Clemens et al. |
| 6,111,747 A | 8/2000 | Jeffries et al. |
| 6,243,265 B1 | 6/2001 | Wong et al. |
| 6,400,572 B1 | 6/2002 | Wu |
| 6,449,154 B1 | 9/2002 | Yoneyama et al. |
| 6,496,371 B2 | 12/2002 | Winkel et al. |
| 6,522,545 B2 | 2/2003 | Shia et al. |
| 6,542,367 B2 | 4/2003 | Shia et al. |
| 6,648,664 B1 | 11/2003 | McHugh et al. |
| 6,850,411 B1 | 2/2005 | Patel |
| 6,968,889 B2 * | 11/2005 | Wang et al. ............... 165/80.1 |
| 7,017,653 B2 | 3/2006 | Lotter et al. |
| 7,035,107 B2 | 4/2006 | Eckblad et al. |
| 7,080,989 B2 | 7/2006 | Gates |
| 7,239,518 B2 * | 7/2007 | Yang et al. ............... 361/704 |
| 7,262,969 B2 | 8/2007 | Lee et al. |
| 7,272,007 B2 * | 9/2007 | Lee et al. ............... 361/704 |
| 7,301,774 B2 * | 11/2007 | Lee et al. ............... 361/719 |
| 7,345,880 B2 * | 3/2008 | Lo ............... 361/704 |
| 7,349,218 B2 * | 3/2008 | Lu et al. ............... 361/679.32 |
| 7,495,922 B2 | 2/2009 | Ploeg et al. |
| 7,573,716 B2 * | 8/2009 | Sun et al. ............... 361/719 |
| 7,609,522 B2 * | 10/2009 | Jin et al. ............... 361/710 |
| 7,675,753 B2 * | 3/2010 | Li et al. ............... 361/719 |
| 7,697,296 B2 * | 4/2010 | Floyd et al. ............... 361/719 |
| 7,885,072 B2 * | 2/2011 | Wu et al. ............... 361/700 |
| 7,969,742 B2 * | 6/2011 | Liu ............... 361/709 |
| 2003/0159819 A1 * | 8/2003 | Lee ............... 165/185 |
| 2009/0021917 A1 * | 1/2009 | Floyd et al. ............... 361/719 |
| 2009/0040721 A1 * | 2/2009 | Lyon ............... 361/697 |

(Continued)

FOREIGN PATENT DOCUMENTS

CN 201436836 U * 4/2010

(Continued)

*Primary Examiner* — Robert J Hoffberg
(74) *Attorney, Agent, or Firm* — Bennett Jones LLP

(57) ABSTRACT

A bracket, computer component and method for connecting to connection points associated with a socket on a computer circuit board are provided. The bracket and computer component have a mounting device including a fastener connectable to one of the connection points and positioned on a mounting flange. The mounting device is adjustable relative to the mounting flange from a first position on the mounting flange to a second position to allow the bracket and computer component to be used in conjunction with a number of different types of sockets.

32 Claims, 4 Drawing Sheets

U.S. PATENT DOCUMENTS

| | | | |
|---|---|---|---|
| 2009/0308573 A1* | 12/2009 | Sun | 165/80.3 |
| 2011/0002104 A1* | 1/2011 | Liu | 361/709 |
| 2011/0108234 A1* | 5/2011 | Cao et al. | 165/67 |
| 2011/0149503 A1* | 6/2011 | Wu | 361/679.46 |

FOREIGN PATENT DOCUMENTS

| | | | |
|---|---|---|---|
| CN | 201667775 U | * | 12/2010 |
| JP | 2007317723 A | * | 12/2007 |

* cited by examiner

ADJUSTABLE MOUNTING BRACKET FOR A COMPUTER COMPONENT

The present invention relates to an adjustable mounting bracket and more particularly to an adjustable mounting bracket for a computer component, such as a cooling component, to allow the computer component to be mounted on a computer circuit board in association with a socket.

BACKGROUND OF THE INVENTION

The main circuit board for a computer, commonly referred to as a motherboard, main board, system board, logic board, etc. often has one or more interfaces that allow a computer processing unit (CPU) to be installed on the circuit board. These interfaces are commonly called sockets. The socket acts as a support structure and an interface between the circuit board and the CPU and typically includes the necessary structure and connection to hold the CPU in place. The socket allows the circuit board to be manufactured and then a CPU subsequently chosen for it and installed. This can allow a computer system to be customized by choosing a specific CPU for a computer. It also allows a new CPU to be added to a circuit board at a later time to upgrade or replace the previous CPU.

The socket is also often associated with structural support and connections to allow a cooling component, such as a heat sink, fan, heat exchanger, other cooling solution, etc., to be connected over top of the CPU and secured in place by mounting connections associated with the socket. After a CPU is installed in a socket, typically, a cooling component is selected and placed over the CPU to cool it. The mounting points are often associated with the socket to allow the cooling component to be secured in place over the CPU provided in the socket.

While a socket may allow a number of different CPUs to be connected to the socket, sockets themselves come in different sizes depending on the type of CPU the motherboard is able to accept. The size and configuration of the sockets on motherboards vary depending on the size and type of CPU meant to be connected to them. Therefore, the position of the mounting points for attaching a cooling component over top of a CPU in the socket often vary depending on the size and type of the socket.

SUMMARY OF THE INVENTION

In a first aspect, a bracket for connecting a computer component to connection points associated with a socket on a computer circuit board is provided. The bracket comprises: at least one attachment mount for attaching the bracket to the computer component; at least one mounting flange; and a mounting device including a fastener connectable to one of the connection points and positioned on the at least one mounting flange, the mounting device adjustable relative to the at least one mounting flange from a first position on to the at least one mounting flange to a second position.

In a second aspect, a computer component adjustably connectable to connection points associated with a socket on a computer circuit board is provided. The computer component comprises: at least one mounting flange; and a mounting device including a fastener connectable to one of the connection points and positioned on the at least one mounting flange, the mounting device movable on the at least one mounting flange from a first position to a second position.

In a third aspect, a method of connecting a computer component to connection points associated with a socket on a circuit board is provided. The method comprises: providing a computer component having a plurality of mounting flanges, each mounting flange having a mounting device provided thereon; adjusting each mounting device relative to the mounting flange to correspond with a spacing of the connection points associated with the socket; and using the mounting devices to secure the computer component to the connection points.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
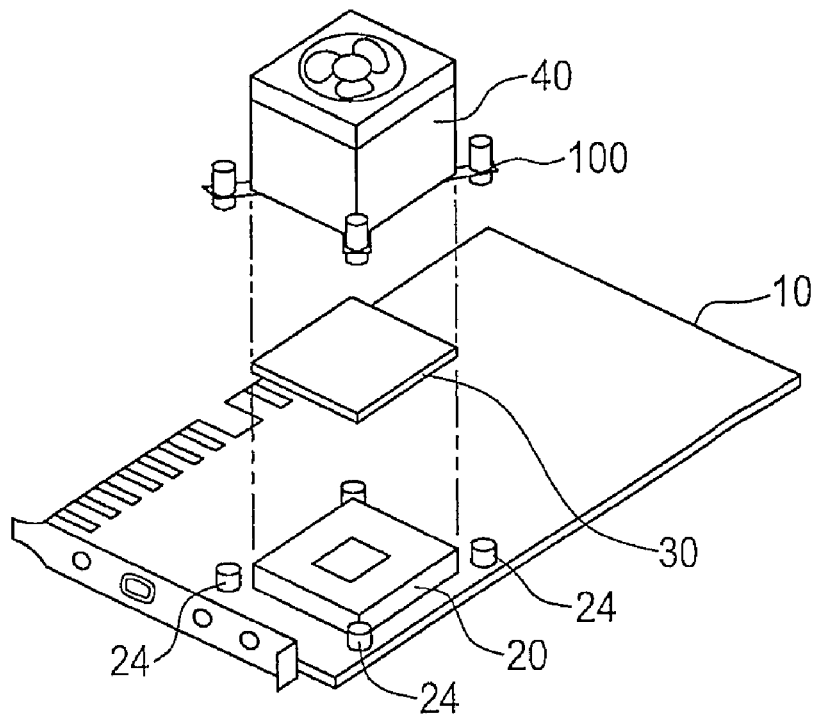
FIG. 1 is a schematic exploded view of a computer circuit board having a socket, a CPU and a computer component.
Figure 2:
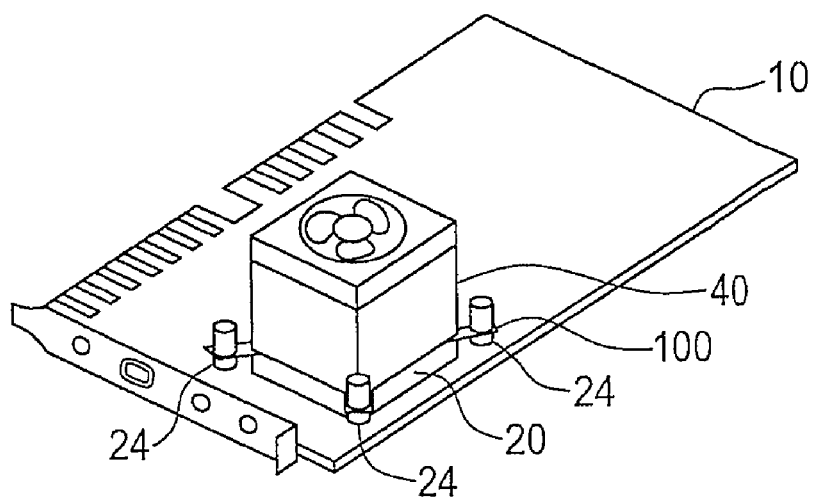
FIG. 2 is a schematic view of the computer circuit board, CPU and computer component of FIG. 1.
Figure 3:
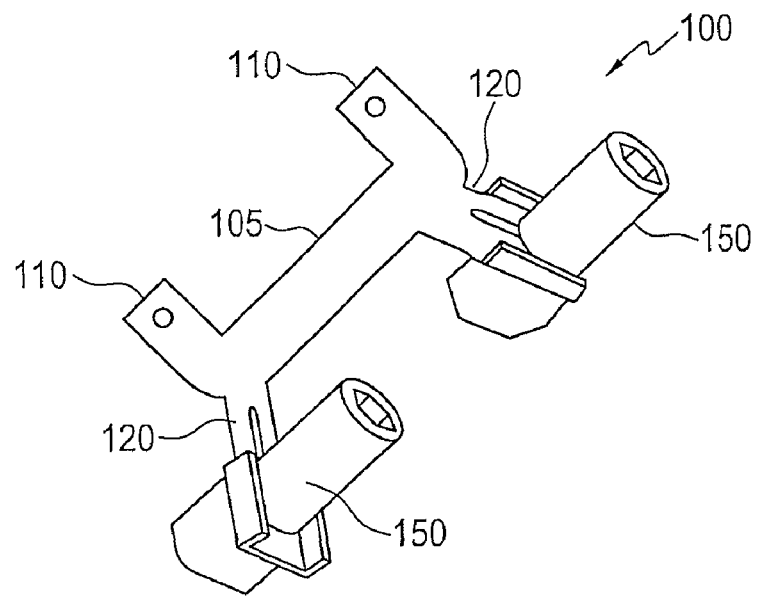
FIG. 3 is a perspective view of a bracket that can be adjusted to connect a computer component to a number of different sized sockets.

FIGS. 1 and 2 illustrate a circuit board 10, such as a motherboard, for use in a personal computer, server, etc. The circuit board 10 can have at least one socket 20 for allowing a CPU 30 to be connected to the circuit board 10. Along with the socket 20 providing connections to allow the CPU 30 to be secured in the socket 20, connection point 24 can be provided to allow a computer component 40, such as a cooling component, to be attached in place over the CPU 30 when the CPU 30 is installed in the socket 20 on the circuit board 10. These connection points 24 can be threaded apertures to receive the end of a threaded fastener, a clip, etc. The computer component 40 can be connected to the connection points 24 associated with the socket 20 using an adjustable bracket 100. FIGS. 1 and 2 are merely schematic illustrations of the circuit board 10. A person skilled in the art will appreciate that many other components may be provided on the circuit board 10 that are not shown FIG. 1.

If the computer component 40 is a cooling component, it can be a heat sink and/or fan (as shown in FIGS. 1 and 2), cooling block, fluid heat exchanger, etc.

Bracket 100 is adjustable so that the computer component 40 can be connected to a number of different sizes of connection mounts associated with various sizes and types of sockets allowing the computer component 40 to be used on a number of different types of circuit boards and CPUs.

FIGS. 3 to 7 illustrate the bracket 100 in one aspect. The bracket 100 can have a member 105 attached to connection mounts 110. The connection mounts 110 can allow the bracket 100 to be attached to a computer component (not shown). Mounting flanges 120 can extend from the member 105. In one aspect, the mounting flanges 120 can extend at substantially forty five (45) degrees from the member 105 so that the mounting flanges 120 extend at substantially a ninety (90) degree angle from each other.

An adjustable mounting device 150 can be provided on each mounting flange 120. Each mounting device 150 can be moved to various positions along the mounting flange 120 to allow the bracket 100 to accommodate various sizes of connection points associated with a number of different types of socket sizes. Moving the mounting devices 150 inwards, towards the member 105, allows the bracket 100 to secure a computer component over top of a CPU in a socket associated with connection points that are closer together. Moving the mounting devices 150 outwards, away from the member 105, allows the bracket 100 to secure a computer component to a socket type associated with connection points spaced further apart from each other. For example, the mounting device 150 can be moved from a first position on the mounting flange 120 to a second position on the mounting flange 120, where the second position corresponds with a connection points associated with one type of socket. With the mounting device 150 at the second position, the bracket 100 can then be used to attach a computer component to connection points associated with that one type of socket.

Figure 6:
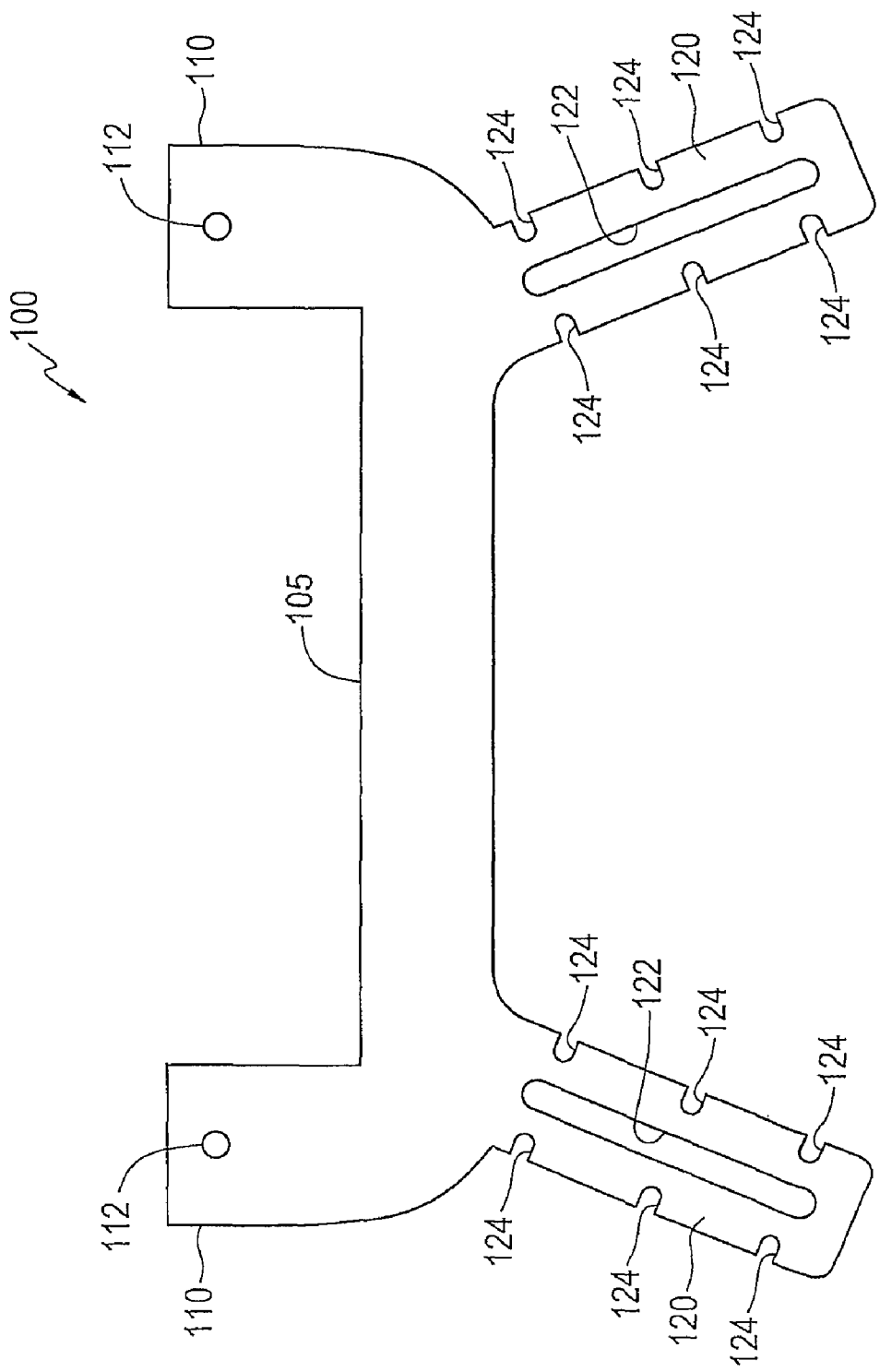
FIG. 6 is a top view of the bracket of FIG. 3 without mounting devices in place.

FIG. 6 illustrates the bracket 100 without the mounting devices 150 in place. Apertures 112 can be provided in the connection mounts 110 to allow the bracket 100 to be attached to a computer component. However, a person skilled in the art will appreciate that various ways could be used to attach the bracket 100 to a computer component.

Slots 122 can be provided in the mounting flanges 120 so that the mounting devices 150 can be adjusted by sliding them relative to the mounting flanges 120 along the slots 122. The slots 122 can define a direction of travel of the mounting devices 150. In one aspect, the direction of travel of each mounting device 150 can be at substantially a right angle to the direction of travel of a mounting device 150 on an adjacent mounting flange 120.

Position indicators 124 can be provided along the mounting flanges 120 and relative to the slots 122. The position indicators 124 can be positioned relative to the slots 122 at positions along the mounting flanges 120 that correspond with connection points associated with commercially available socket types, so that when a mounting device 150 is aligned with a position indicator 124, the mounting device 150 will be attachable to connection points associated with that type of socket.

In one aspect, the position indicators 124 can be notches. The position indicators 124 can then help secure the mounting devices 150 in place in the slots 122 by having a protrusion on the mounting device 150 extend into the notches 124 when the mounting device 150 is aligned with a position indicator 124.

In another aspect, the position indicators 124 could be ball and detent, used to indicate the size connection points associated with commercially available socket types.

Figure 4:
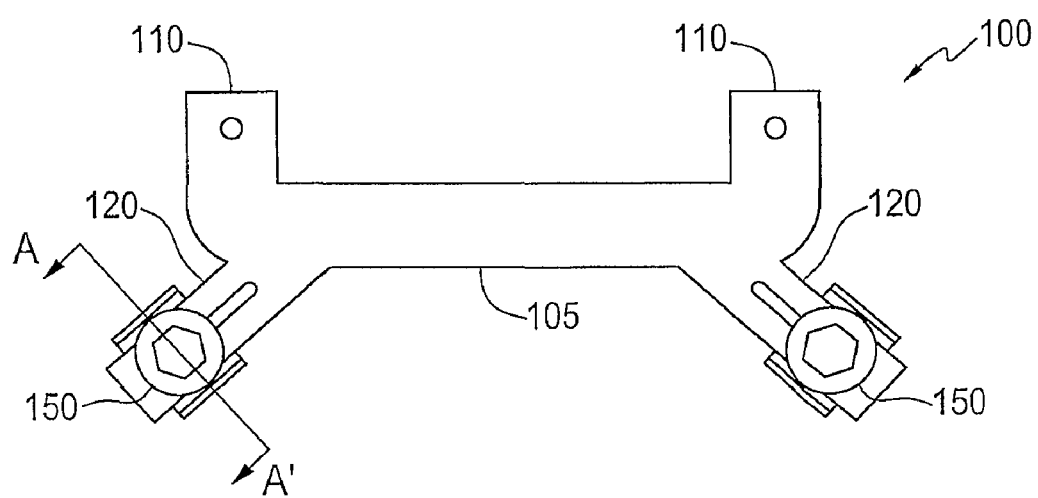
FIG. 4 is a top view of the bracket of FIG. 3.
Figure 5:
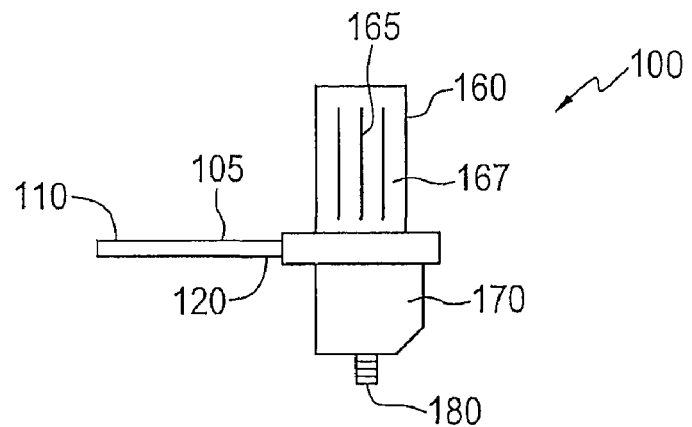
FIG. 5 is a side view of the bracket of FIG. 3.
Figure 7:
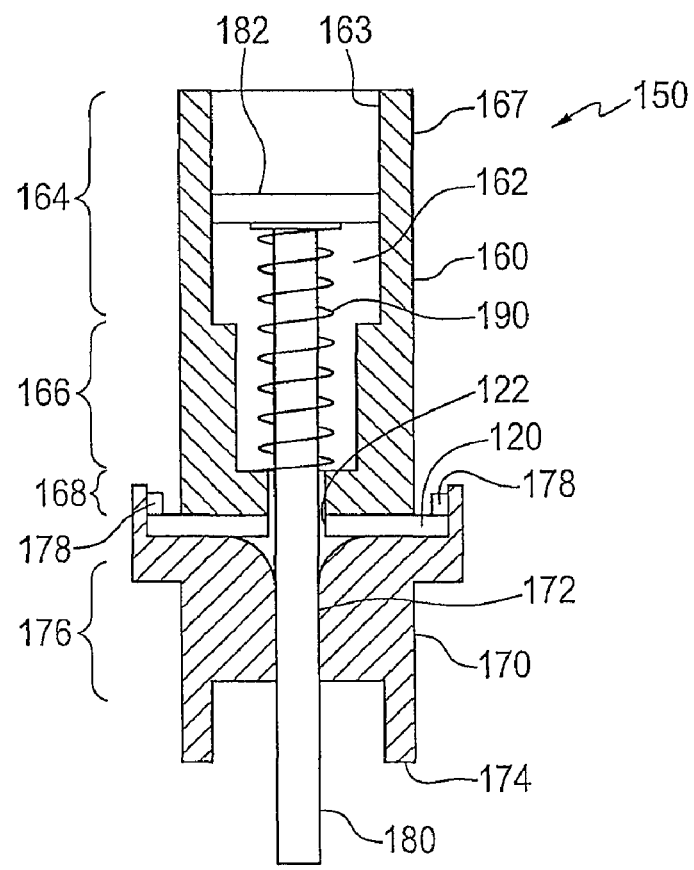
FIG. 7 is a side sectional view of a mounting device on the bracket along line AA' shown in FIG. 4.

FIG. 7 is a side sectional view of a mounting device 150 taken along sectional line AA' in FIG. 4. Mounting device 150 can have an upper portion 160 and a lower portion 170 with the mounting flange 120 of the bracket 100 positioned in between the upper portion 160 and the lower portion 170. The upper portion 160 can have an aperture 162 extending therethrough to allow a fastener 180 to pass through the upper portion 160. An aperture 172 can be provided passing through the lower portion 170. The aperture 162 in the upper portion 160 and the aperture 172 in the lower portion 170 can allow the fastener 180 to extend through the aperture 162 in the upper portion 160 of the mounting device 150, out the bottom of the upper portion 160, through the slot 122 in the mounting flange 120, into the aperture 172 in the lower portion 170 and extend out a bottom 174 of the lower portion 170. By allowing the fastener 180 to extend out the bottom end 174 of the lower portion 170, the fastener 180 can be used to secure the bracket 110, and a computer component attached to the bracket 110, to connection points associated with a socket on a computer circuit board.

A biasing device 190, such as a spring, can be provided in the aperture 162 of the upper portion 160 with the biasing device 190 in contact with an underside of the head 182 of the fastening device 180.

The upper portion 160 can have an open top 163 so that a head 182 of the fastener 180 can be reached through the open top 163. Allowing a screwdriver (not shown) to engage with the head 182 of the fastener 180. In one aspect, the aperture 162 can have a polygonal (such as a hexagonal) cross section to mate with a hexagonal shaped head 182 of the fastener 180 so that the fastener 180 can be rotated by rotating the entire upper portion 160. The upper portion 160 can have ridges 165 provided in the outer surface 167 of the upper portion 160 to aid a person in gripping the upper portion 160 of the mounting device 150 with their fingers and rotating it when they are attaching the bracket 100 and a computer component attached to the bracket 100 to connection points associated with a socket.

In one aspect, the aperture 162 in the upper portion 160 can have a first section 164 sized to fit the head 182 of the fastener 180, a second section 166 sized to form a cavity to receive the compressed biasing device 190 when the bracket 100 is used to mount a computer component over top of a CPU in a socket, and a third section 168 sized to form a seat for an end of the biasing device 190, but with a large enough diameter to allow the fastener 180 to pass through the third section 168.

The aperture 172 in the lower portion 170 can contain a gripping section 176 that will grip the fastener 180 as it passes through the aperture 172 in the lower portion 170. In one aspect, the gripping section 176 could be a narrowed portion of the aperture 172 made of sufficiently soft material so that threads on the fastener 180 can cut through the material surrounding the gripping section 176. Alternatively, the gripping section 176 could have any number of structures to grip or secure a portion of the fastener 180 in the lower portion 170, for example, the gripping section 176 can have threads formed in the walls of the aperture 172 that match threads on the fastener 180, the gripping section 176 could have a lock nut provided in the lower portion 170, etc. In this manner, the gripping section 176 can hold the fastener 180 in place inside the aperture 172 in the lower portion 170 of the mounting device 150.

By providing a gripping section 176 in the lower portion 170 to grip a portion of the fastener 180 in the aperture 172 in the lower portion 170 of the mounting device 150 while the biasing device is imparting a force between the head 182 of the fastener 180 and the upper portion 160, the biasing device 190 can impart a biasing force to the upper portion 160 and the lower portion 170 forcing the upper portion 160 and the lower portion 170 in contact against the mounting flange 120 positioned in between them If the position indicators 124 on the mounting flanges 120 are notches, protrusions 178 can be provided on the mounting device 150 that mate with the notches forming the position indicators 124. In this manner, the protrusions 178 can protrude into the notches forming the position indicators 124 when the mounting device 150 is aligned with a position indicator 124. Although the protrusions 178 are shown on the lower portion 170 of the mounting device 150 in FIG. 7, a person skilled in the art will appreciate that they can also be provided on the upper portion 160.

Referring to FIGS. 3-7, the position of the mounting devices 150 on the mounting flanges 120 can be adjusted to correspond with the various spacings of connection points associated with different types of sockets so that a computer device attached to the bracket 100 can be used with a number of different types of sockets. To adjust the position of the mounting device 150 relative to the mounting flange 120, the lower portion 170 of the mounting device 150 and the upper portion 160 can be pulled apart, overcoming the biasing force imposed on the upper portion 160 and the lower portion 170 by the biasing device 190. Overcoming the biasing force exerted by the biasing device 190 can cause the head 182 of the fastening device 180 to move downwards in the aperture 162 of the upper portion 120, causing the upper portion 160 and lower portion 170 to separate from the mounting flange 120. With the upper portion 160 and the lower portion 170 of the mounting device 150 separated from the mounting flange 120, the mounting device 150 to be moved along the mounting flange 120, with the fastener 180 sliding along the slot 122 in the mounting flange 120. If the mounting device 150 has protrusions 178, the upper portion 160 and the lower portion 170 can be separated enough so that the protrusions 178 are removed from the notches forming the position indicator 124, allowing the mounting device 120 to be moved relative to the mounting flange 120. The mounting device 150 can be moved along the mounting flange 120 with the fastener 180 sliding through the slot 120 until the mounting device 150 reaches a position relative to the mounting flange 120 that corresponds to connection points associated with a socket type the computer component is going to be used with. When the mounting device 150 reaches this position, the upper portion 160 and the lower portion 170 can be released causing the biasing device 190 to once again bias the upper portion 160 and the lower portion 170 against the mounting flange 120 holding the mounting device 150 in position. If protrusions 178 are provided on the mounting device 150, the protrusions 178 can be inserted into a notch forming a position indicator 124 at the new position, helping to secure the mounting device 150 in place on the mounting flange 150.

Referring to FIGS. 1-7, in operation, a computer component 40 can be connected to a socket 20 over top of a CPU 30 using the adjustable bracket 100. The computer component 40 can be connected to the bracket 100 using the connection mounts 110 to secure the bracket 100 to the computer component 40. In one aspect, the computer component 40 can have an indent in the bottom, so that the connection mounts 110 and the arm 105 of the bracket 100 can slide into this indent so that only the mounting flanges 120 protrude outwards from the computer component 40. The indent can have a depth that is substantially the same as the thickness of the arm 105 and connection mounts 110 so that when a bracket 100 is attached to the computer component 40, the bracket 100 is flush with a bottom of the computer component 40. Alternatively, the bracket 100 could be manufactured in place on the computer component 100 so that the mounting flanges 120 extend outwards from the computer component 100.

A CPU 30 can be installed in the socket 20. Once the CPU 30 is installed in the socket 20, each mounting device 150 on its corresponding mounting flange 120 positioned so that it corresponds with the connection points 24 associated with the socket 20. When each of the mounting devices 150 has been adjusted to correspond with the connection points 24 associated with the socket 20, the computer component 40 can be positioned over the socket 20 and the CPU 30 installed in the socket 20 and secured in place on the socket 20 by using the fasteners 180 in each mounting device 150 to secure the computer component 40 to the connection points 24.

In this manner, the mounting device 150 can be adjusted to accommodate different spacings of connection points 24 associated with a socket 20, allowing the same computer component 40 that is provided with the mounting flanges 120 and mounting devices 150 to used with different types of sockets.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A bracket for connecting a computer component to connection points associated with a plurality of computer circuit boards, each of the plurality of computer circuit boards having a different sized socket, the bracket comprising:
   at least one attachment mount for attaching the bracket to the computer component;
   at least one mounting flange;
   a mounting device including an upper portion provided on one side of each mounting flange of the at least one mounting flange; a lower portion provided on an other side of the each mounting flange; and a fastener passing through the upper portion and the lower portion, the fastener connectable to one of the connection points and positioned on the at least one mounting flange, the mounting device adjustable relative to the at least one mounting flange from a first position on the at least one mounting flange corresponding to a first spacing of the connection points associated with a first type of the different sized socket to a second position corresponding to a second spacing of the connection points associated with a second type of the different sized socket; and
   a slot provided in the at least one mounting flange, the fastener passing through the slot so that the slot defines a path of movement between the first position and the second position of the mounting device relative to the at least one mounting flange.

2. The bracket of claim 1 wherein the mounting device further comprises a biasing device that exerts a biasing force on the upper portion and the lower portion that forces the upper portion and the lower portion against the at least one mounting flange.

3. The bracket of claim 2 wherein the mounting device can be moved from the first position to the second position by overcoming the biasing force imposed by the biasing device and sliding the mounting device along the at least one mounting flange to the second position.

4. The bracket of claim 3 wherein the biasing device is provided in the upper portion and biases a head of the fastener away from the at least one mounting flange and the lower portion has a section for gripping the fastener.

5. The bracket of claim 1 wherein the fastener passes from the upper portion, through the at least one mounting flange, through the lower portion and out a bottom end of the lower portion.

6. The bracket of claim 1 wherein the at least one mounting flange further comprises at least one position indicator positioned relative to the slot and indicating the second position.

7. The bracket of claim 6 wherein the at least one position indicator includes a notch in the at least one mounting flange that mates with a protrusion on the mounting device to secure the mounting device at the second position.

8. The bracket of claim 1 wherein each mounting device of the mounting device on a mounting flange of the at least one mounting flange extends outwards at a substantially right angles to a direction of extension of an adjacent mounting device of the mounting device on an adjacent mounting flange of the at least one mounting flange.

9. A bracket for connecting a computer component to connection points associated with a plurality of computer circuit boards, each of the plurality of computer circuit boards having a different sized socket, the bracket comprising:
at least one attachment mount for attaching the bracket to the computer component;
at least one mounting flange; a mounting device including an Upper portion provided on one side of each mounting flange of the at least one mounting flange; a lower portion provided on an other side of the each mounting flange; and a fastener passing through the upper portion and the lower portion, the fastener connectable to one of the connection points and positioned on the at least one mounting flange, the mounting device adjustable relative to the at least one mounting flange from a first position on the at least one mounting flange corresponding to a first spacing of the connection points associated with a first type of the different sized socket to a second position corresponding to a second spacing of the connection points associated with a second type of the different sized socket; and
a biasing device that exerts a biasing force on the upper portion and the lower portion that forces the upper portion and the lower portion against the at least one mounting flange,
wherein the mounting device can be moved from the first position to the second position by overcoming the biasing force imposed by the biasing device and sliding the mounting device along the at least one mounting flange to the second position.

10. The bracket of claim 9 wherein the fastener passes from the upper portion, through the at least one mounting flange, through the lower portion and out a bottom end of the lower portion.

11. The bracket of claim 9 further comprising a slot provided in the at least one mounting flange, the fastener passing through the slot so that the slot defines a path of movement between the first position and the second position of the mounting device relative to the at least one mounting flange.

12. The bracket of claim 9 wherein the biasing device is provided in the upper portion and biases a head of the fastener away from the at least one mounting flange and the lower portion has a section for gripping the fastener.

13. The bracket of claim 9 wherein the at least one mounting flange further comprises at least one position indicator positioned relative to the slot and indicating the second position.

14. The bracket of claim 13 wherein the at least one position indicator includes a notch in the at least one mounting flange that mates with a protrusion on the mounting device to secure the mounting device at the second position.

15. The bracket of claim 9 wherein each mounting device of the mounting device on a mounting flange of the at least one mounting flange extends outwards in a direct at a substantially right angles to a direction of extension of an adjacent mounting device of the mounting device on an adjacent mounting flange of the at least one mounting flange.

16. A bracket for connecting a computer component to connection points associated with a plurality of computer circuit boards, each of the plurality of computer circuit boards having a different sized socket, the bracket comprising:
at least one attachment mount for attaching the bracket to the computer component;
at least one mounting flange; and
a mounting device including an upper portion provided on one side of each mounting flange of the at least one mounting flange; a lower portion provided on an other side of the each mounting flange; and a fastener connectable to one of the connection points and positioned on the at least one mounting flange, the mounting device adjustable relative to the at least one mounting flange from a first position on to the at least one mounting flange corresponding to a first spacing of the connection points associated with a first type of the different sized socket to a second position corresponding to a second spacing of the connection points associated with a second type of the different sized socket,
wherein the fastener passes from the upper portion, through the at least one mounting flange, through the lower portion and out a bottom end of the lower portion.

17. The bracket of claim 16 wherein the mounting device further comprises a biasing device that exerts a biasing force on the upper portion and the lower portion that forces the upper portion and the lower portion against the at least one mounting flange.

18. The bracket of claim 17 wherein the mounting device can be moved from the first position to the second position by overcoming the biasing force imposed by the biasing device and sliding the mounting device along the at least one mounting flange to the second position.

19. The bracket of claim 18 wherein the biasing device is provided in the upper portion and biases a head of the fastener away from the at least one mounting flange and the lower portion has a section for gripping the fastener.

20. The bracket of claim 16 further comprising a slot provided in the at least one mounting flange, the fastener passing through the slot so that the slot defines a path of movement between the first position and the second position of the mounting device relative to the at least one mounting flange.

21. The bracket of claim 16 wherein the at least one mounting flange further comprises at least one position indicator positioned relative to the slot and indicating the second position.

22. The bracket of claim 21 wherein the at least one position indicator includes a notch in the at least one mounting flange that mates with a protrusion on the mounting device to secure the mounting device at the second position.

23. The bracket of claim 16 wherein each mounting device of the mounting device on a mounting flange of the at least one mounting flange extends outwards at a substantially right angles to a angles to a direction of extension of an adjacent mounting device of the mounting device on an adjacent mounting flange of the at least one mounting flange.

24. A computer component adjustably connectable to connection points associated with a plurality of computer circuit boards, each of the plurality of computer circuit boards having a different sized socket, the computer component comprising:
- at least one mounting flange;
- a mounting device including an upper portion provided on one side of each mounting flange of the at least one mounting flange; a lower portion provided on an other side of the each mounting flange; and a fastener passing through the upper portion and the lower portion, the fastener connectable to one of the connection points and positioned on the at least one mounting flange, the mounting device movable on the at least one mounting flange from a first position corresponding to a first spacing of the connection points associated with a first type of the different sized socket to a second position corresponding to a second spacing of the connection points associated with a second type of the different sized socket; and
- a biasing device that exerts a biasing force on the upper portion and the lower portion that forces the upper portion and the lower portion against the at least one mounting flange,
- wherein the mounting device can be moved from the first position to the second position by overcoming the biasing force imposed by the biasing device and sliding the mounting device along the at least one mounting flange to the second position.

25. The computer component of claim 24 wherein the fastener passes from the upper portion, through the at least one mounting flange, through the lower portion and out a bottom end of the lower portion.

26. The computer component of claim 25 further comprising a slot provided in the at least one mounting flange, the fastener passing through the slot so that the slot defines a path of movement between the first position and the second position of the mounting device relative to the at least one mounting flange.

27. The computer component of claim 26 wherein the at least one mounting flange further comprises at least one position indicator positioned relative to the slot and indicating the second position.

28. The computer component of claim 27 wherein the at least one position indicator includes a notch in the at least one mounting flange that mates with a protrusion on the mounting device to secure the mounting device at the second position.

29. The computer component of claim 24 wherein the computer component is a cooling component.

30. The computer component of claim 29 wherein the cooling component is at least one of: a heat sink, a fan, and a heat exchanger.

31. A method of connecting a computer component to connection points associated with a plurality of circuit boards, each of the plurality of circuit boards having a different sized socket on the each of the plurality of circuit boards, the method comprising:
- providing a computer component having a plurality of mounting flanges and a plurality of mounting devices, each mounting flange of the plurality of mounting flanges having a mounting device of the plurality of mounting devices provided thereon;
- adjusting each mounting device of the plurality of mounting devices relative to the each mounting flange to correspond with a spacing of the connection points associated with the socket; and
- using the plurality of mounting devices to secure the computer component to the connection points associated with the each of the plurality of circuit boards having the different sized socket,
- wherein the each mounting device of the plurality of mounting devices is adjusted by separating an upper portion of the mounting device and a lower portion of the mounting device from the each mounting flange and after separating, moving the upper portion of the mounting device and the lower portion of the mounting device between the first position and the second position along the each mounting flange of the plurality of mounting flanges.

32. The method of claim 31 wherein the each mounting device is adjusted by moving the each mounting device in a direction along the each mounting flange that is at substantially a right angle to a direction of motion of an adjacent mounting device.

* * * * *